Jan. 23, 1923.

J. F. DEFORDT.
FREE WHEEL CLUTCH.
FILED MAR. 21, 1921.

J. F. DEFORDT.
FREE WHEEL CLUTCH.
FILED MAR. 21, 1921.

Patented Jan. 23, 1923.

UNITED STATES PATENT OFFICE.

JULES FREDERIC DEFORDT, OF IXELLES, BRUSSELS, BELGIUM.

FREE-WHEEL CLUTCH.

Application filed March 21, 1921. Serial No. 454,191.

*To all whom it may concern:*

Be it known that I, JULES FREDERIC DEFORDT, a subject of the King of Belgium, and resident of Ixelles, Brussels, Belgium, have invented certain new and useful Improvements in Free-Wheel Clutches, of which the following is a specification.

This invention relates to free wheel clutches which will satisfactorily transmit heavy forces and will at the same time be quite free on the backward movement.

A clutch according to my invention comprises essentially two concentric wheels, one of which wheels is adapted to receive an oscillating or rotary movement and to transmit this movement to the other wheel in the form of an intermittent or continuous rotary movement by means of a plurality of movable teeth, rollers or the like one or more of which are adapted to simultaneously engage opposing abutments on the peripheries of the two wheels the characterizing feature being that the movable teeth, rollers or the like are different in number from the abutments of the concentric wheels.

The movable teeth may be either positively moved into position for engagement by means operable in response to relative movement between the two wheels or the same may be moved into the engaging position by means of springs.

In order that the invention may be clearly understood two examples of the same will now be described by aid of the accompanying drawings in which:—

Figure 1:
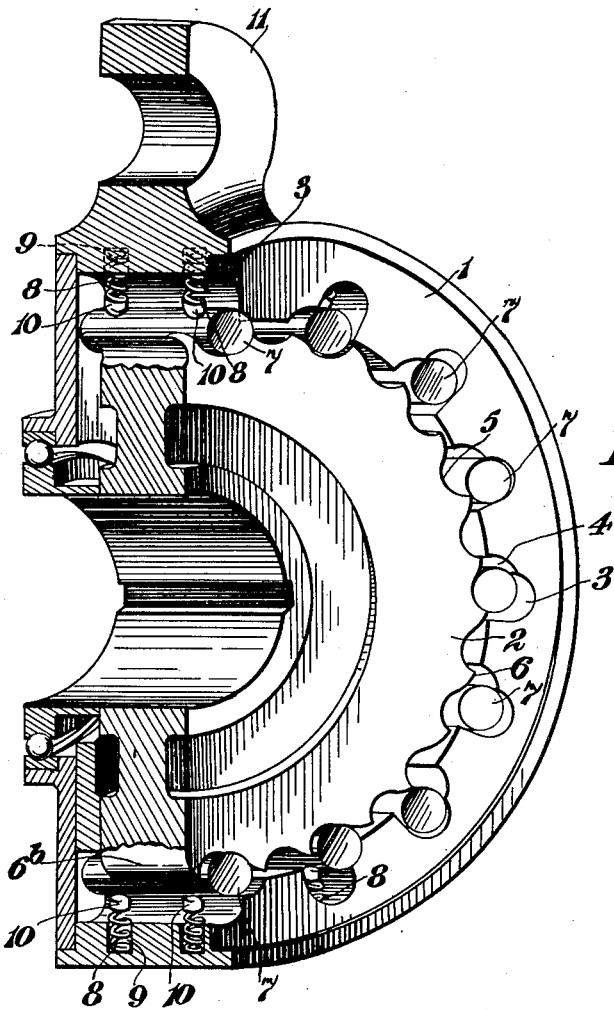
Fig. 1 is a sectional perspective view of a free wheel clutch in which the movable teeth consist of spring controlled rollers.
Figure 2:
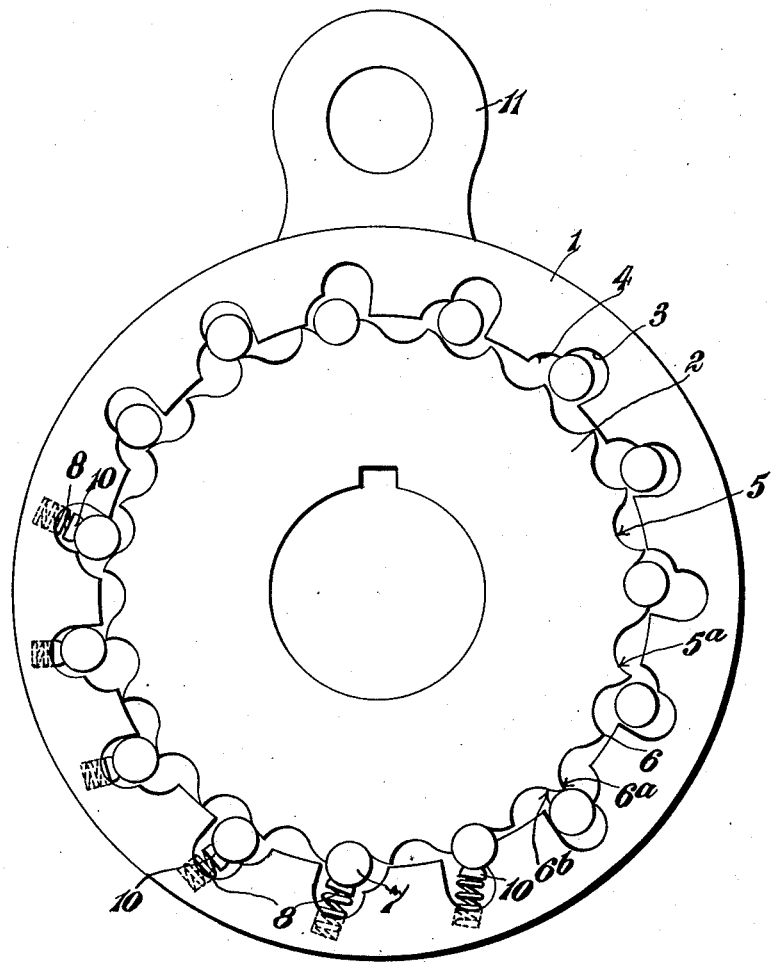
Fig. 2 is a side elevation of the same with one of the side covers removed.

The free-wheel clutch illustrated in Figs. 1 and 2 comprises two wheel members 1 and 2 arranged co-planar and concentrically with each other.

The concave periphery of the outer member 1 is provided at equal spaced intervals with transverse grooves 3 and semi-circular transverse abutments 4. The convex periphery of the inner member 2 is also provided at equal spaced intervals with transverse grooves 5 which exceed in number the other grooves 3 for a purpose hereafter to be described.

These grooves 5 are cut substantially to the form of buttress teeth with semi-circular abutment faces 5ª adapted to oppose the abutments 4 on the other member 1. The adjacent sides of these grooves 5 meet and form sharp peaks 6 each having a substantially vertical side 6ª and an inclined side 6ᵇ.

The means for effecting a driving engagement between the two wheel members consequent upon the relative movement of the outer member, comprise a series of steel rollers 7 which are normally held in engagement with the periphery of the inner member 2 by springs 8. In the example illustrated two springs are provided to each roller the outer ends of which are located in pockets 9 in the bottom ends of the grooves 3 whilst the inner ends of the same are provided with cap members 10 having semi-spherical ends which engage with the surfaces of the rollers.

According to one application of the free-wheel clutch the outer member 1 is adapted to be oscillated by suitable mechanism such as an eccentric the connecting link or links of which are attached to a lug 11 on the wheel member 1 of the free wheel clutch. On the oscillation of the wheel member 1 in an anti-clockwise direction the rollers 7 pass freely over the periphery of the inner wheel member 2 but on the oscillation of the wheel member 1 in the reverse direction one or more of the rollers 7 are each engaged between two opposing abutments 4 and 5ª, thus providing a positive driving connection between the two wheel members. In the example illustrated only one roller is in the engaged position at a time. The number of rollers that are in engagement simultaneously is however dependent upon the relative difference in the numbers of the abutments on the two wheel members so that by decreasing the relative difference shown it is possible to obtain two diametrically opposite rollers in engagement to transmit the drive at each effective oscillatory stroke of the outer wheel member 1.

By thus providing a greater number of abutment faces 5ª on the periphery of the inner wheel member 2 one or more rollers are always in a position where they may readily drop into the engaging position at the end of each idle oscillatory stroke with the result that the positive engagement between the two wheel members on the effective or working stroke occurs immediately and without jar however small the oscillating stroke of the outer member 1 may be. This feature is of primary importance where the load is heavy and the speed imparted by the free wheel clutch is low as a driving engagement between the two wheel members is obtainable with but a small relative oscillatory movement of the outer wheel member.

It will of course be appreciated that the outer member 1 may be continuously driven by gearing or a chain and sprocket teeth according to the particular purpose for which the clutch is required.

What I claim and desire to secure by Letters Patent is:—

1. A free wheel clutch comprising inner and outer concentric wheel members, radial grooves in the inside periphery of the outer wheel member said grooves extending the full width of said wheel member, teeth of concave-convex form on the outer periphery of the inner wheel member, rollers disposed between the opposing peripheral faces of the wheel members and extending the full width of the same, semi-circular abutments at one edge of, and extending the full width of, each radial groove said abutments being adapted to oppose the similarly shaped portions of the teeth on the inner wheel member which portions also constitute abutments whereby when the free wheel is turned in the fixed wheel direction some of the rollers engage between opposing abutments and when the free wheel is turned in the opposite direction said rollers are caused to move into the radial grooves by the action of the teeth on the inner wheel member and means tending to force said rollers inward against the periphery of the inner wheel member substantially as specified.

2. A free wheel clutch comprising inner and outer concentric wheel members, radial grooves in the inside periphery of the outer wheel member said grooves extending the full width of said wheel member, teeth of concave-convex form on the outer periphery of the inner wheel member, the number of said teeth being greater than the number of said radial grooves, rollers disposed between the opposing peripheral faces of the wheel members and extending the full width of the same, semi-circular abutments at one edge of, and extending the full width of, each radial groove said abutments being adapted to oppose the similarly shaped portions of the teeth on the inner wheel member which portions also constitute abutments whereby when the free wheel is turned in the fixed wheel direction some of the rollers engage between opposing abutments and when the free wheel is turned in the opposite direction said rollers are caused to move into radial grooves by the action of the teeth on the inner wheel member and springs tending to force said rollers inwardly against the periphery of the inner wheel member substantially as specified.

In witness whereof I affix my signature.

JULES FREDERIC DEFORDT.

Witnesses:
Y. J. ZALEDEFL,
EMILE VON WANCEL.